United States Patent
Swildens et al.

(12)

(10) Patent No.: US 7,032,010 B1
(45) Date of Patent: *Apr. 18, 2006

(54) SCALABLE DOMAIN NAME SYSTEM WITH PERSISTENCE AND LOAD BALANCING

(75) Inventors: Eric Sven-Johan Swildens, Mountain View, CA (US); Richard David Day, Mountain View, CA (US); Vikas Garg, Milpitas, CA (US)

(73) Assignee: Speedera Networks, Inc., Santa Clara, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 10/873,895

(22) Filed: Jun. 21, 2004

Related U.S. Application Data

(63) Continuation of application No. 09/638,170, filed on Aug. 11, 2000, now Pat. No. 6,754,706.

(60) Provisional application No. 60/172,303, filed on Dec. 16, 1999.

(51) Int. Cl.
*G06F 13/00* (2006.01)

(52) U.S. Cl. .................. 709/219; 709/225; 709/226; 709/227

(58) Field of Classification Search ............... 709/217, 709/219, 223, 225, 226, 227, 245
See application file for complete search history.

(56) References Cited

U.S. PATENT DOCUMENTS

| | | | |
|---|---|---|---|
| 6,182,148 B1 * | 1/2001 | Tout | 709/245 |
| 6,205,481 B1 | 3/2001 | Heddaya et al. | |
| 6,381,627 B1 * | 4/2002 | Kwan et al. | 709/201 |
| 6,438,652 B1 | 8/2002 | Jordan et al. | |
| 6,535,509 B1 | 3/2003 | Amicangioli | |
| 6,560,717 B1 * | 5/2003 | Scott et al. | 714/4 |
| 6,578,066 B1 * | 6/2003 | Logan et al. | 718/105 |
| 6,671,259 B1 * | 12/2003 | He et al. | 370/238 |
| 6,724,733 B1 | 4/2004 | Schuba et al. | |
| 6,785,769 B1 | 8/2004 | Jacobs et al. | |
| 6,795,434 B1 | 9/2004 | Kumar et al. | |

* cited by examiner

*Primary Examiner*—Viet D. Vu
(74) *Attorney, Agent, or Firm*—Hickman Palermo Truong & Becker, LLP

(57) ABSTRACT

A scalable domain name system with persistence and load balancing receives requests from client DNS servers or other DNS servers. Each DNS server is associated with a subset of the DNS groups in the network and the invention checks to see if the client DNS server is part of the DNS group that the DNS server is authoritative. If the DNS server is not authoritative for the client DNS server's group, then the request is forwarded to the proper DNS server. The receiving DNS checks to see if a persistent response is required for the request. If a persistent response is required, the appropriate IP address is returned to the requestor. If a persistent response is not required, the load, availability, and latency of the content servers are used to determine the proper content server's address to return to the requestor.

21 Claims, 6 Drawing Sheets

SCALABLE DOMAIN NAME SYSTEM WITH PERSISTENCE AND LOAD BALANCING

CROSS-REFERENCES TO RELATED APPLICATIONS

The present application is a continuation of U.S. patent application Ser. No. 09/638,170 filed Aug. 11, 2000 now U.S. Pat. No. 6,754,706, which is incorporated by reference for all purposes and which claims priority to Provisional U.S. Patent Application No. 60/172,303 filed on Dec. 16, 1999.

BACKGROUND OF THE INVENTION

1. Technical Field

The invention relates to Internet protocol networking in a computer environment. More particularly, the invention relates to the routing and load balancing of traffic in a Domain Name System in a computer environment.

2. Description of the Prior Art

Global traffic management systems are at the beginning formulative stages of development. Most systems do not have to manage a large amount of traffic. The systems either do not deal with persistence or synchronization of DNS servers or, if they do, they perform the tasks in a very inefficient and cumbersome way by shipping huge tables between servers.

Domain Name System (DNS) servers in the Internet and in Intranets are sent requests to determine machine IP addresses associated with a given name. DNS servers can perform load balancing by returning different IP addresses for different requests to a server and can also be modified to return IP addresses that are close to an end user in terms of latency.

For example, assume three IP addresses 1.1.1.1, 1.1.1.2 and 1.1.1.3 are valid IP addresses for www.speedera.com. When a DNS server receives a request for the IP address of www.speedera.com, it could return 1.1.1.1 for the first request, 1.1.1.2 request for the second address, etc. This would cause requests for www.speedera.com to be distributed among the three IP addresses and among three machines, if each IP address represents a different machine.

If the DNS server has access to information about the load on the three machines, it could return IP addresses based on machine load to perform load balancing intelligently. Also, if a DNS server has access to information about the latency between various points on the network, it can determine which IP address(es) to return based on the latency between the machine with that IP address and the machine where the request came from.

These features are commonly used in combination to create an advanced load balancing DNS server. More advanced DNS servers can provide support for "persistence". Some services, such as web shopping carts, require persistence.

"Persistence" is when the first time a request is made for an IP address of a hostname from a given user, a persistent entry is stored on the server that ties that user to the IP address. Subsequent requests from the same user for the IP address of the domain name first requested will return the same IP address that was returned the first time, as long as that IP address can handle the request.

To handle persistence, a DNS server can maintain a table that contains a mapping of machine IP addresses and hostnames to IP addresses. When processing a DNS request, the DNS server consults the table to determine if a persistent entry exists that ties a machine IP address (identifying a group of users) and hostname to IP address.

Persistent tables can be very large. Typically, when multiple DNS servers manage a hostname, each individual server needs access to the persistence table. This leads to a significant amount of network traffic overhead when the tables are kept synchronized between multiple servers.

Most existing approaches simply do not allow more than one load balancing DNS server to be authoritative for a given domain name when using persistence. Persistence is supported when only a single DNS server is authoritative for a given domain name in these approaches.

Other existing solutions that support persistence when more than one DNS server is authoritative for a given domain name, work by keeping all the persistence tables in the authoritative DNS servers synchronized. When a persistent entry is added or deleted, it must be added or deleted to all DNS servers that are authoritative for a given domain name.

Similarly, latency tables and other tables that are keyed off a user group (Client DNS Server) are either kept in a single location or are synchronized across multiple servers where the full latency table is kept on each server.

It would be advantageous to provide a scalable domain name system with persistence and load balancing that provides both persistence and load balancing on a DNS server and reduces the amount of information stored on the server. It would further be advantageous to provide a scalable domain name system with persistence and load balancing that reduces the traffic across the network when table synchronization is used.

SUMMARY OF THE INVENTION

The invention provides a scalable domain name system with persistence and load balancing. The system performs both load balancing and persistence tracking on a DNS server while reducing the amount of information stored on the DNS server. In addition, the invention reduces network traffic required for information synchronization between DNS servers.

An embodiment of the invention receives requests from client DNS servers or other DNS servers. The invention checks to see if the client DNS server is part of the DNS group that the DNS server is authoritative. Each DNS server is associated with a subset of the DNS groups in the network.

If the DNS server is not authoritative for the client DNS server's group, then the request is forwarded to the proper DNS server. Otherwise, the invention checks a persistence table to see if a persistent response is required for the request. If a persistent response is required, the appropriate IP address entry in the table is returned to the requestor.

If a persistent response is not required, the invention determines the load, availability, and latency of the content servers from information stored in a latency table to determine the proper content server to reference. The proper content server's address is returned to the requestor.

The DNS server sends any responses to forwarded requests to the client DNS server.

When more than one DNS server is authoritative for an overlapping DNS group, the invention ensures that the persistence and latency tables are synchronized with any other DNS servers. The invention also allows the persistence and latency tables to be located on a set of table servers within the network.

Another aspect of the invention allows the DNS server that a request is forwarded to, to respond directly to the client. The client is redirected to the DNS server.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a scalable domain name system with persistence and load balancing in a computer environment. A system according to the invention performs both load balancing and persistence tracking on a DNS server while reducing the amount of information stored on the DNS server. In addition, the invention provides a system that reduces network traffic required for information synchronization between DNS servers.

Global traffic management systems are at the beginning formulative stages of development. Most systems do not have to manage a large amount of traffic. The systems either do not deal with persistence or synchronization of DNS servers or, if they do, they perform the tasks in a very inefficient and cumbersome way by shipping huge tables between servers.

If there are more than one DNS servers in a network, each DNS server must record the IP address that each client has requested. Each DNS server must then tell the other DNS servers in the network the same information so the other DNS servers can be consistent in responding to the client. As a result, the tables where the DNS servers record this type of information are extremely large. This approach is currently limited to a single domain.

The problem with this approach is that the synchronization between many servers is an enormous task. When the servers are geographically distributed and there are multiple domains, this approach is unable to manage the information overhead.

Load balancing DNS servers which allow for persistent connections and/or take latency into account when determining responses, are not currently scalable when more than one DNS server is required to be authoritative for a domain name. This is because persistence and latency tables are kept entirely on each server. When multiple servers are used, the persistence and latency tables are kept on each server instead of being distributed among servers.

Figure 1:
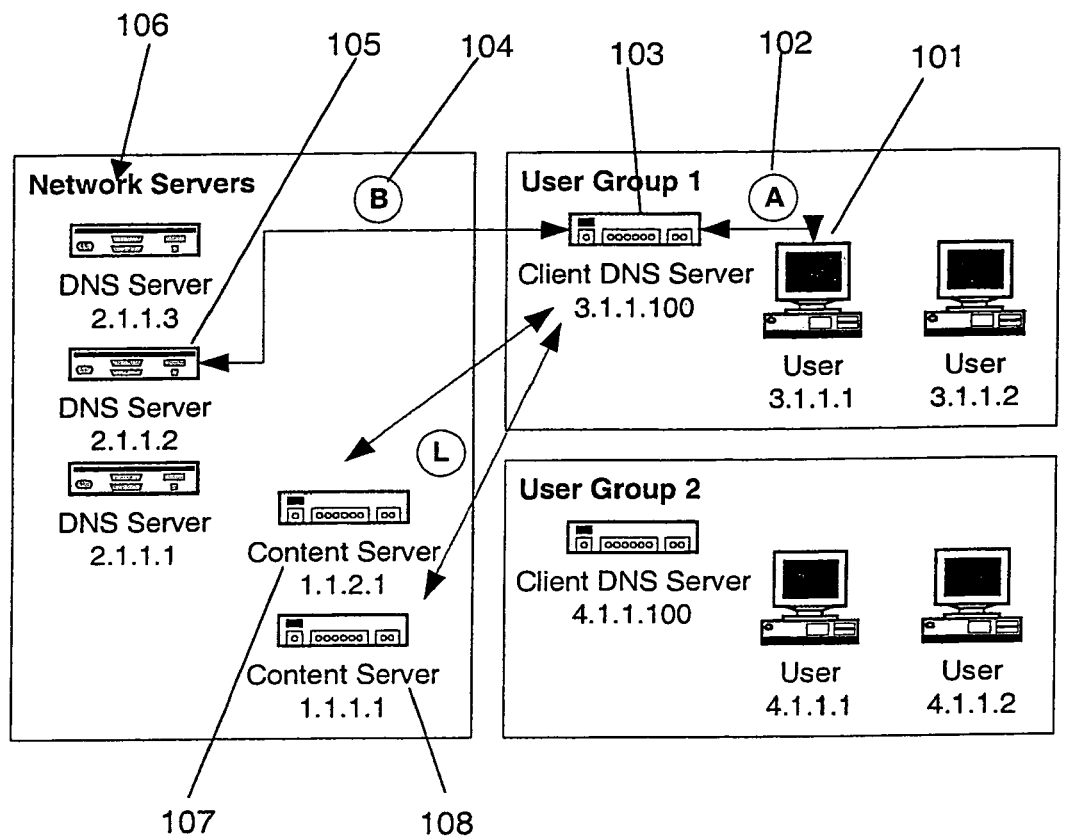
FIG. 1 is a block schematic diagram of a prior art approach to for handling persistence and latency according to the invention.

Referring to FIG. 1, the commonly used model for handling persistence tables and latency is shown. This example shows the basic process an existing load balancing DNS server uses to respond to a client request.

A User 101 makes a request to resolve a name www.name.com 102 to the User's Client DNS Server 103. The Client DNS Server 104 sends the request 104 to the DNS Server 105 because the DNS Server 105 is authoritative for the domain www.name.com within the Network Servers 106.

The DNS server 105 determines the load and availability of the content servers 107, 108. The DNS server 105 consults a table containing persistent entries, using the Client DNS Server (which identifies a group of users) and hostname as keys, to determine if a persistent response should be returned.

If not, the DNS server 105 determines the availability and latency from its content servers 107, 108 to the Client DNS server 103. The DNS server 105 returns a response to the Client DNS Server 103 which returns a response to the User 101.

In current systems, when multiple DNS servers are used and persistence is required, each DNS server is required to maintain a table containing a full set of persistent entries. These tables need to be synchronized between all the DNS servers. When an entry is added, it must be added to all DNS servers and when an entry is removed, it must be removed from all DNS servers.

A preferred embodiment of the invention reduces the size of the persistence tables that are maintained when multiple DNS servers are used and decreases the amount of persistent table synchronization that needs to be performed when multiple DNS servers are used. In addition, the invention decreases the overall size of any other tables associated with groups of users that need to be maintained in a group of DNS servers, including latency tables.

The invention spreads the table of persistent entries across multiple servers by making each DNS server authoritative for only a given subset of DNS Client servers.

Figure 2:
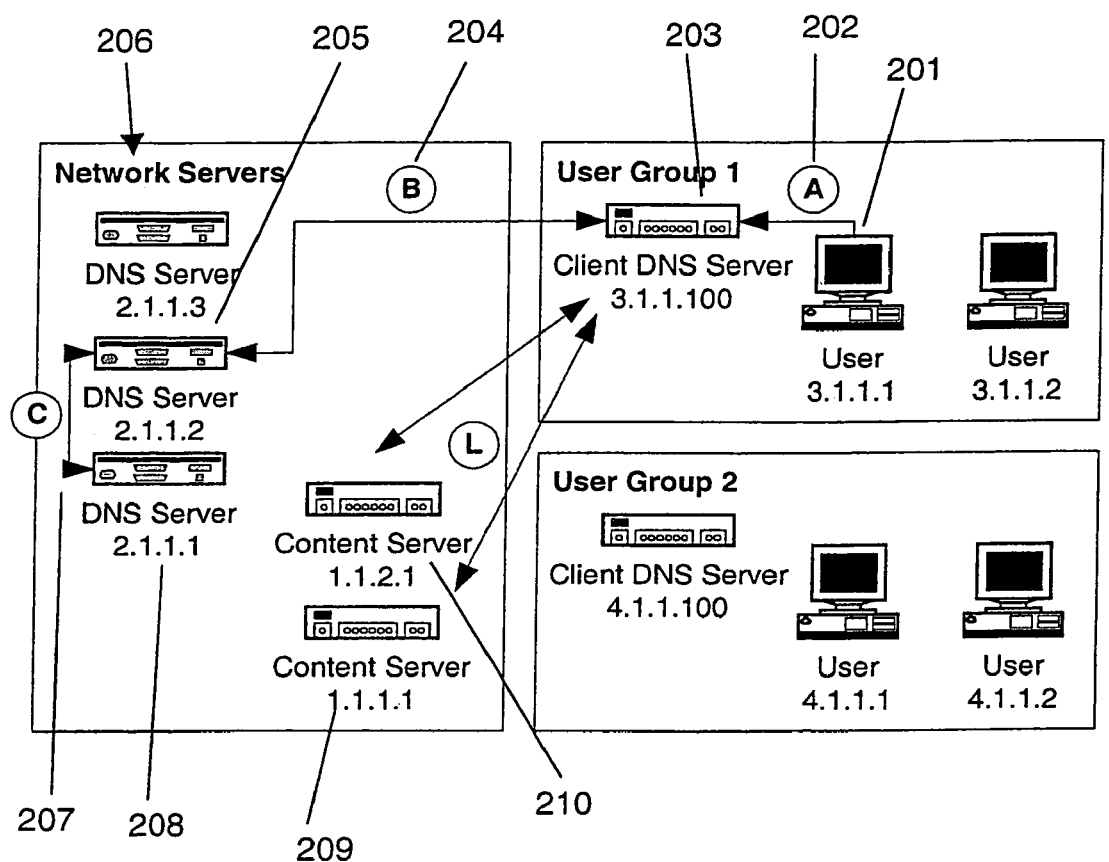
FIG. 2 is a block schematic diagram of the DNS server load balancing and persistency of a preferred embodiment of the invention according to the invention.
Figure 3:
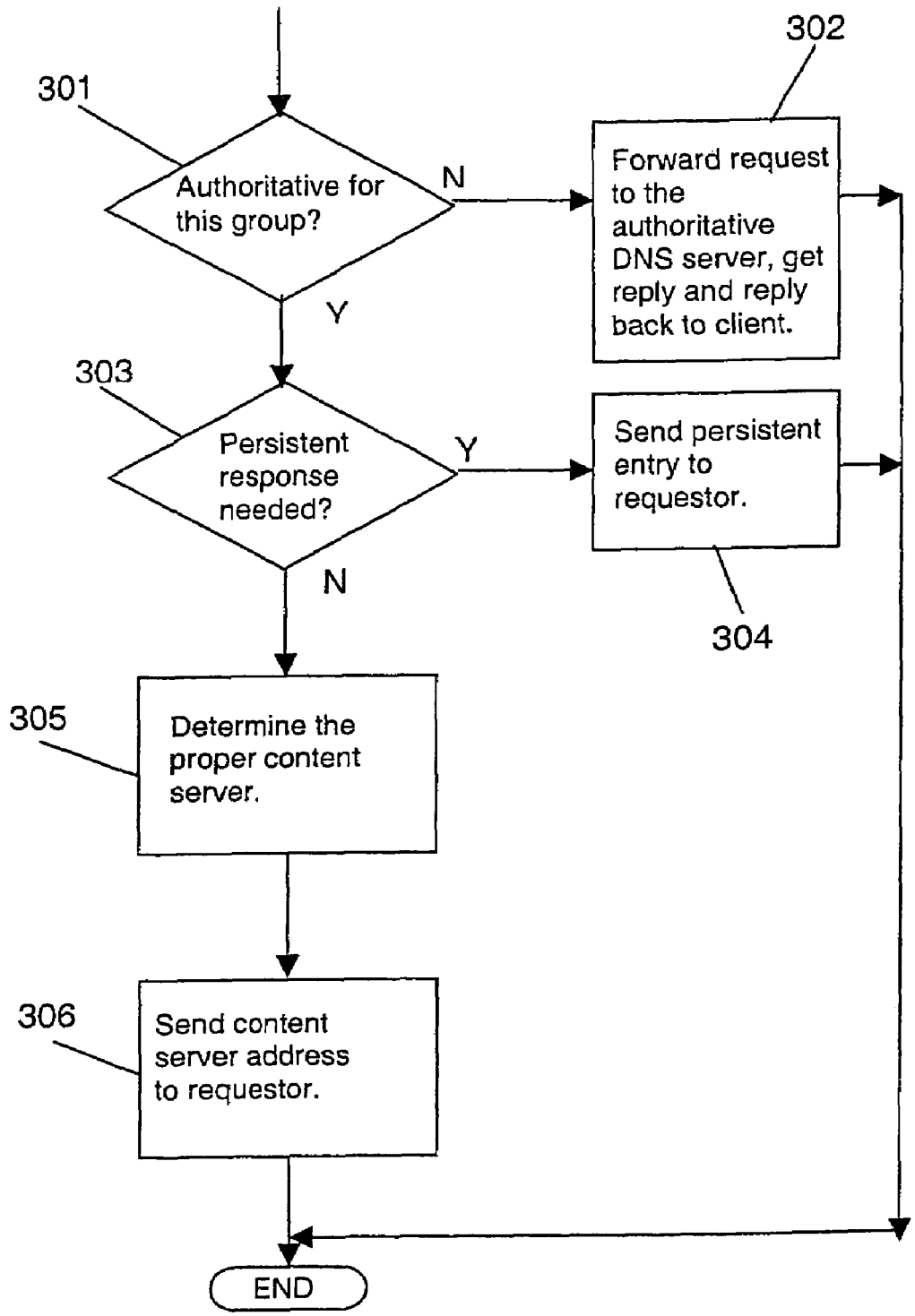
FIG. 3 is a block schematic diagram of the decision flow of a DNS server in a preferred embodiment of the invention according to the invention.

With respect to FIGS. 2 and 3, the invention's basic process for how a load balancing DNS server responds to a client request is shown. When a User 201 refers to a specific URL, e.g., www.speedera.net, the User 201 asks the local Client DNS server 202 what the IP address is for that URL address 202. The Client DNS Server 203 sends the request 204 to the DNS Server authoritative for the domain 205.

The DNS Server 205 decides if it is authoritative 301 for the Client DNS Server 203 by looking at a table containing DNS servers and the Client DNS server groups they are authoritative for. By consulting the table, the DNS Server 205 determines that DNS Server 208 is authoritative for Client DNS server 205 and forwards the request 207, 302 to DNS Server 208.

The DNS Server 208 performs the same decision making process and checks to see if it is authoritative 301 for the Client DNS Server 203. Here, it finds that it is authoritative for Client DNS Server 203. Alternatively, to save time and processing power, the DNS Server 208 determines if the request was forwarded from another DNS server (here, DNS Server 205). If the request was forwarded, then the DNS Server 208 immediately knows that it is authoritative for the client DNS server (here, Client DNS Server 203).

The DNS server 208 then checks if a persistent response is required for this request 303. It consults a table containing persistent entries, with the Client DNS Server 203 and hostname as keys, to determine if a persistent response should be returned. If a persistent response is required, the IP address entry in the table is returned to the requestor 304 (here DNS Server 205).

If not, the DNS server 208 determines the load and availability of the content servers 209, 210 and the latency from its content servers 209, 210 to the Client DNS server 203 to determine the proper content server to reference 305.

The DNS server 208 returns a response to the requestor 306. In this example, the response is sent 207 to DNS server 205.

DNS server 205 returns a response 204 to the Client DNS Server 203 which returns a response 202 to the User 201.

An important feature of the invention is that when multiple DNS servers are used, each server is only authoritative for handling requests from a given group of users. Users are grouped by which Client DNS server they use. If a DNS server in the Network Server group gets a request from a user group it is not authoritative for, it will forward the request to a DNS server that is authoritative for that user group.

The invention has numerous advantages over traditional methods but requires one more network hop than traditional methods. The main advantage is that, because each server is only authoritative for a given range of Client DNS servers (user groups), each server needs to only maintain data associated with that range of Client DNS servers. For persistence and latency, each DNS server is only required to maintain persistence and latency tables for the Client DNS servers it is authoritative for.

The latency tables in the invention contain latency metrics from each latency point to each DNS client that accesses the system. These tables will end up being very large. The tables are so large that they are split among the DNS servers in the network. Each DNS server will be associated with some subset of the total number of DNS groups. Initially, a DNS group will be all DNS servers within a certain IP mask.

When a DNS client hits a DNS server in the network. the DNS server may not have the information available locally to respond to the request. The DNS server will need to find the DNS server in the network that is associated with the DNS group of the client hitting it and forward the request to that DNS server. Each DNS group can be hosted on at least two DNS servers for high availability.

Each POP (cluster of servers at a single location) in the network may have an associated latency point. A POP can also have no latency point and have a list of statically assigned "close" IP addresses. This will be used when a POP is at an ISP, for instance. When placing a POP at an ISP (such as Best or AOL), we won't want to put a latency probe at the POP since the only DNS clients that it will service are those of the ISP itself (no other machines will be "close" in terms of latency). In these cases, it is desirable to statically assign a list of client DNS IP addresses that are "close" to the POP instead of having a latency server.

The DNS server drives the latency probes in the network. The latency probes are inactive until a DNS server instructs them to do something When a DNS server gets a hit from a DNS client from a DNS group it supports, it will consult its latency tables. These may be old and stale. It will need to make a best guess of which IP address to give out from the stale latency tables.

The DNS server will then need to tell all the latency probes in the network to probe for the latency to that DNS group so when the Time To Live (TTL) of the DNS client expires, the DNS server has more up to date information.

The DNS server maintains an internal table like the following example:

| Latency Point | DNS Group | Latency | Latency Time Stamp | Last NetProbe Request Sent |
|---|---|---|---|---|
| 1.2.3.4 | 2.3.4.0 | 300 ms | 9129384 | 91945123 |

When it gets a request, it scans its tables to determine if any latency points are stale. It will know if they are stale by the latency timestamp and the last NetProbe request sent timestamp. It contains a Last NetProbe Request timestamp to prevent it from flooding a NetProbe with requests in an interval if it receives lots of requests from a single DNS group.

When it finds that It is accessing stale information, it sends the Latency Point a notice to perform a latency calculation to that DNS Group to get the DNS server some new information. It also sends out requests in chunks in an interval of some value that is a third or so of the TTL it gives out.

The latency probes in the invention are responsible for sending DNS servers latency metric information. A given POP (cluster of machines) in the network can share a single latency probe or each have their own latency probe.

A latency probe does nothing on its own, it is driven by the DNS servers in the network. A NetProbe will get a request from a DNS Server to perform latency probes.

The latency probe will perform one of any number of methods to determine the latency (network round trip time) from its location to a client DNS location. One probe that could be performed would be sending a 'ping' packet to the client DNS. Another is using a traceroute method to determine latency to the router closest to the client DNS. Yet another method is sending the client DNS a reverse name server lookup of the client IP address and timing the reply. The methods and order are configurable in the invention.

The latency probe must take care not to get overwhelmed with requests from DNS servers. It should not attempt to do more latency probes than it can safely handle.

Different probe methods are attempted until one yields a result. An individual method may not work due to firewalls placed at various locations in the network so the latency probe will attempt to use a different method if the first does not work.

The latency probes will send latency results only to DNS servers that need the latency information for a given group. Each DNS server will be associated with some subset of the total number of DNS groups. For example, DNS Server A will handle DNS client IP addresses 1.0.0.0–100.0.0.0 and DNS Server B will handle DNS client IP addresses 100.0.0.1–255.255.255.255.

When a latency probe has results for its probe to server 4.4.4.4, it should only send those results to DNS Server A, not DNS Server B.

DNS client grouping is not required and individual DNS clients may be tracked when storing and looking up data in a table. The level of grouping can vary with the desire to maintain more accurate latency data. For example, DNS clients can be grouped by a mask of 255.255.255.0. However, if the desire is to store better latency numbers, then each DNS client is individually tracked. This is just a different level of grouping using a mask of 255.255.255.255—i.e., one client DNS in each group.

Hostnames in the invention can be designated as requiring persistence. Persistence means when a DNS client makes a request for an IP address for a given name (e.g., www.customer.com) and a DNS server returns an IP address, the DNS server should return that same IP address for subsequent requests. This is used when a server in the network maintains some state information on it, for example, some data associated with an HTTP cookie.

Persistent will mean that when a client's TTL expires and it re-requests an IP address, it will get the same IP address again and will go to the same server. If it went to a different server, the cookie information wouldn't be on that server and the client's session would be broken. The persistent entry should time out after some period of inactivity on the client's side.

Like latency tables, persistence tables are large. Each DNS server will be responsible for some subset of the total number of DNS groups.

For persistent hostnames, when a DNS request comes in from a client, the DNS server goes through the same process as it does for latency except that before using latency and server metrics to determine a reply, it checks its persistent table to see if there is a persistence entry. If there is and the service on that machine is still functional, it will return the persistent IP address.

Each DNS server needs to maintain a persistence. Unlike latency values. the persistence tables will need to be synchronized among all DNS servers that are authoritative for a given range of client DNS groups.

For example, DNS server A handles groups 0.0.0.0–10.0.0.0 and DNS server C also handles 0.0.0.0–10.0.0.0 (for high availability reasons). When server A makes an entry for a server into its persistence table, it will need to let server C know about it.

There also needs to be synchronization between the servers so before an entry is deleted, the other servers must okay the deletion. Otherwise, it is possible that only one DNS server sees activity from a group while the other doesn't and the other times out the entry when it shouldn't be.

Figure 4:
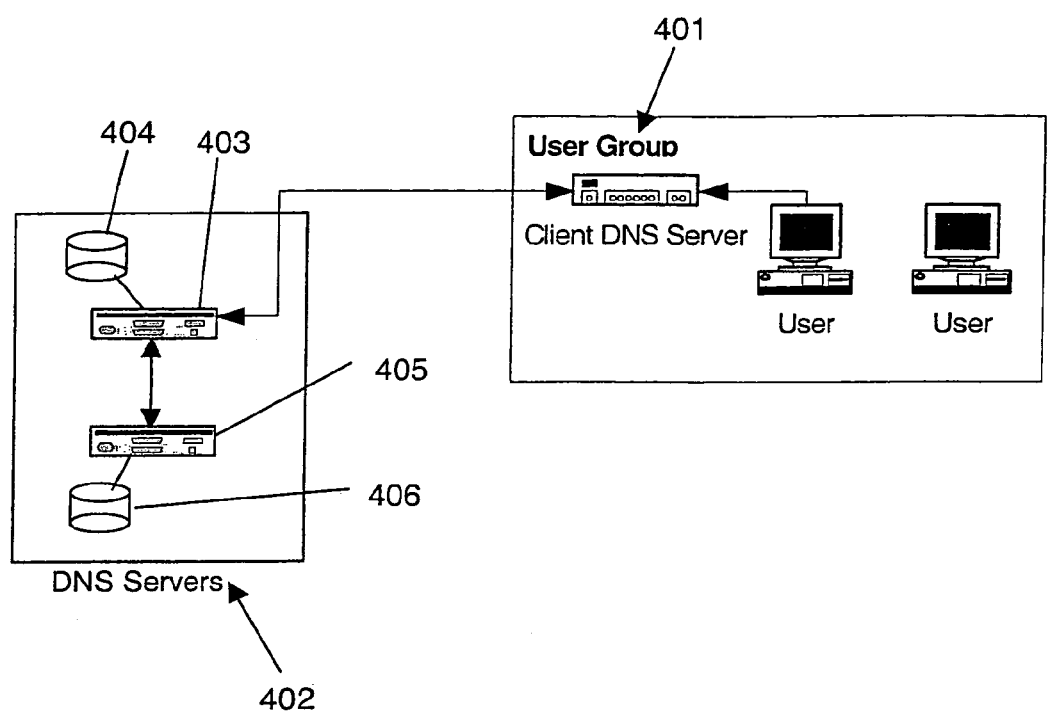
FIG. 4 is a block schematic diagram of a backup DNS server system according to the invention.

Referring to FIG. 4, the invention allows for backup servers by allowing multiple DNS servers 402 to be authoritative for the same subset of Client DNS Servers 401. When backups are used, all DNS servers 403, 405 that are authoritative for a given name are required to have the same information and keep each other in sync if necessary. When additions or deletions are made to tables 404 on one DNS Server 403 that is authoritative for a given Client DNS Server 401, it must also update any other DNS Server 405 and its tables 406 that is authoritative for that server.

Figure 5:
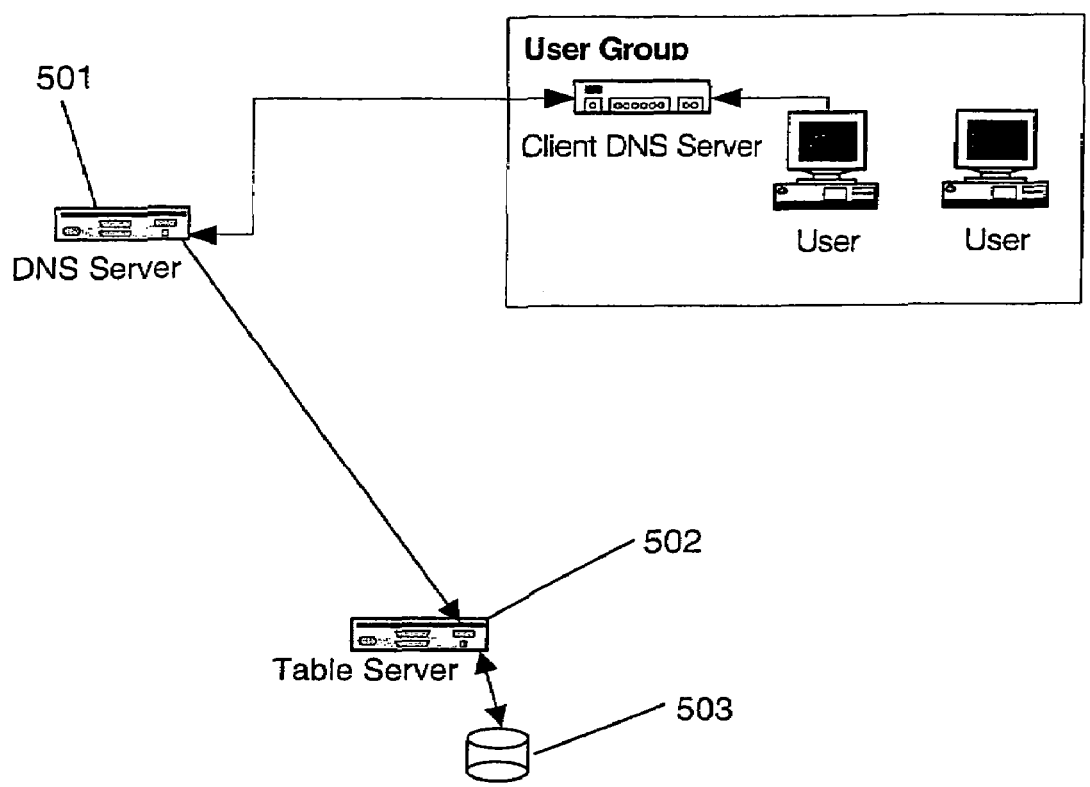
FIG. 5 is a block schematic diagram of a table server interfacing into a DNS server network according to the invention.

With respect to FIG. 5, instead of having the DNS server 501 maintain the tables, the tables could be maintained on a separate set of servers 502 that just contain tables 503. Using this method, the basic features of the invention could be used to spread the tables across a set of table servers.

Another aspect of the invention is to allow the DNS server that a request is forwarded to, to respond directly to the client. However, the client will be expecting a response from the DNS server it sent the request to and this modification requires forging IP addresses.

Another modification is when a DNS server that is not authoritative for a client DNS request has proxied the request to an authoritative DNS server, it returns a record in the DNS response to the client telling the client that the next time this type of request is to be performed, it should contact the DNS server authoritative for the client.

The DNS server does this by sending the client a DNS response that contains a record showing that the DNS server authoritative for the client is the server authoritative for the hostname the client DNS is looking up. In the future, all requests from the client DNS server for the domain name queried will go to the load balancing DNS server that is authoritative for the client directly.

When there are multiple DNS servers that are authoritative for that Client DNS server, the DNS server that gets the original request can perform load balancing among the authoritative DNS servers.

Figure 6:
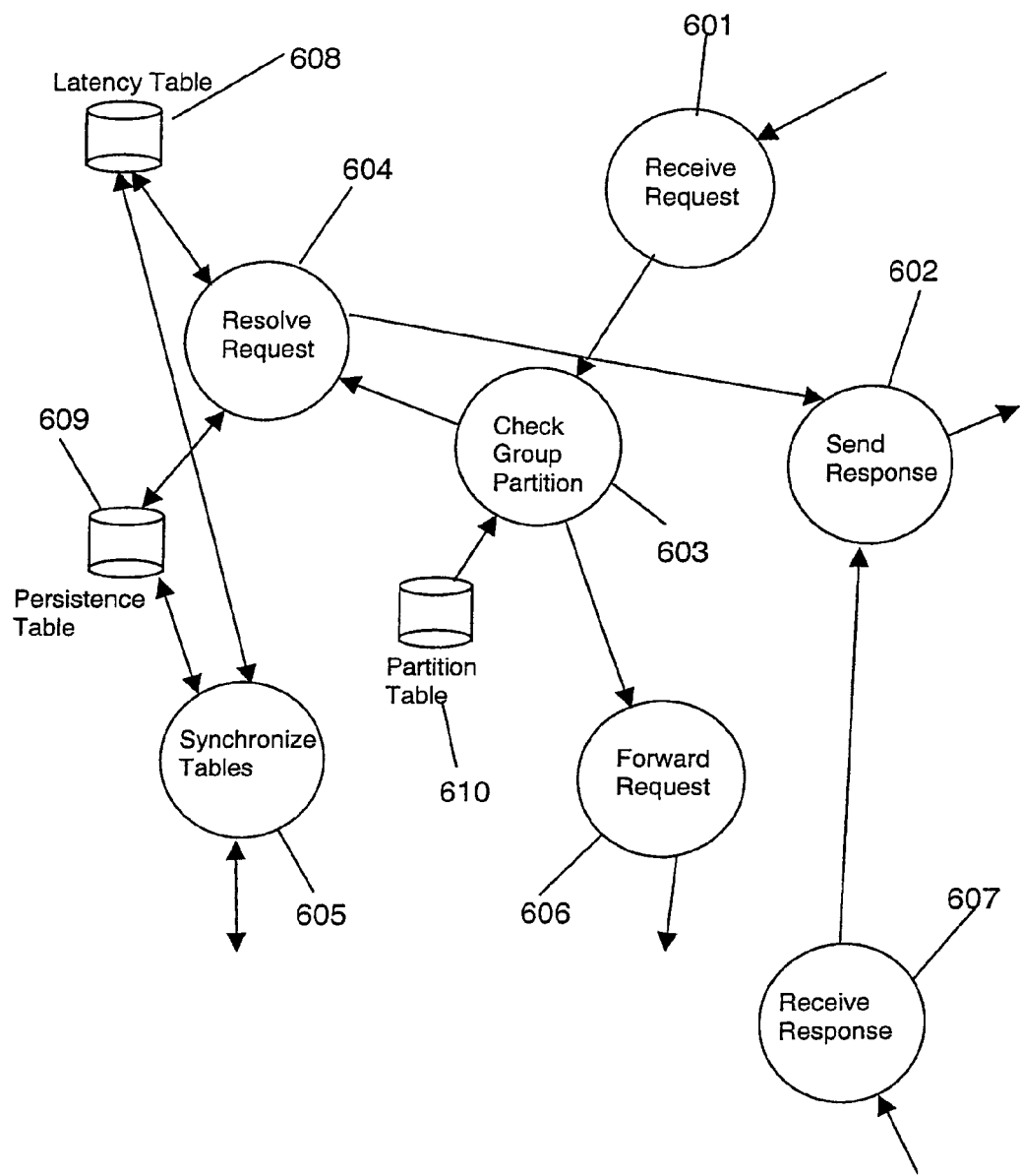
FIG. 6 is a block schematic diagram of a task viewpoint of the DNS server in a preferred embodiment of the invention according to the invention.

Referring to FIG. 6, a task oriented view of the invention is shown. The Receive Request module 601 receives any requests from client DNS servers or other DNS servers. Requests are forwarded to the Check Group Partition module 603. The Check Group Partition module 603 checks the Partition Table 610 to see if the client DNS server is part of the DNS group that the DNS server is authoritative.

If the DNS server is not authoritative to the client DNS server's group, then the request is forwarded to the proper DNS server by the Forward Request module 606. Otherwise, the request is sent to the Resolve Request module 604.

The Resolve Request module 604 checks the Persistence Table 609 to see if a persistent response is required for this request using the Client DNS Server and hostname as keys. If a persistent response is required, the IP address entry in the table is returned to the requestor through the Send Response module 602.

If not, the Resolve Request module 604 determines the load, availability, and latency of the content servers in the Latency Table 608 to determine the proper content server to reference. The Resolve Request module 604 returns a response to the requestor through the Send Response module 602.

One example of a load balancing algorithm follows:
1. If request is not for local DNS, forward the request to appropriate DNS server.
2. If the DNS server cannot handle the request (unknown hostname etc.) forward the request to NAMED.
3. If the hostname is statically mapped, just return all the IP addresses for that hostname.
4. If the hostname is persistent, and has a persistent entry, and that server has an error count less than the error threshold defined for that hostname, return that server.
5. Get the list of servers that can service the request.
6. Get the load metrics for all the servers.
7. Get the latency for all the servers, if latency does not exist, use the default value (very high latency).
8. If the error count for a server is not 0, assign it a priority of UINT32_MAX.
9. If the load time stamp is older than the load time stamp cliff (2.5 times the servp send interval), assign it a priority of UINT32_MAX.
10. If the weight for the server is 0, assign it a priority of (UINT32_MAX−1).
11. Age the latency values using the formula (latencyTSCliff is 1.5 times the latency probe interval):

latency=latency*(1+(latencyTimeStamp−currentTime)/latencyTSCliff)

12. Calculate the final priority using the formula:

priority=(LoadFactor*load+latency)/weight

13. If the priority exceeds (UINT32_MAX−2) set the priority to (UINT32_MAX−2).

14. Select the servers with the lowest priority. If there are multiple servers with the same priority, select the servers randomly.
15. Send out latency requests.
16. For persistent hostnames, add the server to persistent table.
17. Add the NS records.
18. Return the response to the client.
19. Log the request.

Responses to requests forwarded from the Forward Request module 606 are received by the Receive Response module 607. The Receive Response module 607 sends the response to the client DNS server through the Send Response module 602.

When more than one DNS server is authoritative for an overlapping DNS group, the Synchronize Tables module 605 ensures that the Persistence Table 609 and Latency Table 608 are synchronized with any other DNS servers.

This invention decreases the amount of storage (memory or disk) and network bandwidth required when multiple load balancing DNS servers that support persistence are deployed. It can also decrease the amount of memory required for other tables keyed by user or user group, such as latency tables, when multiple DNS servers are deployed.

Most importantly, it creates a scalable distributed DNS architecture supporting latency and persistence among multiple DNS servers. The invention keeps the amount of network traffic and memory as a constant and distributes it among the servers, making each one more efficient as more servers are added.

In other solutions, an addition of DNS servers would increase the amount of network traffic and memory required by the overall system.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method, comprising:
    receiving a client's Internet Protocol (IP) address request at a Domain Name Server (DNS) server among a plurality of DNS Servers;
    checking if the receiving DNS server is authoritative for the request;
    forwarding the request to a proper DNS server if the receiving DNS server is not authoritative for the request;
    wherein each DNS server is associated with a subset of DNS groups in a network;
    checking if a persistent response to the request is required;
    sending an appropriate IP address of a content server as a response to the sender of the request if a persistent response is required; and
    wherein the DNS server performs load balancing of the request among a plurality of content servers if no persistent response is required.

2. The method of claim 1, wherein the proper DNS server that the request is forwarded to responds directly to the client.

3. The method of claim 1, wherein the DNS server periodically checks a content server's status for load balancing purposes.

4. The method of claim 1, wherein the DNS server refers to a latency table for load balancing that contains any combination of: content server load, content server latency, and content server availability.

5. The method of claim 4, wherein latency probes periodically measure latency of content servers.

6. The method of claim 1, wherein the DNS server refers to a persistence table that is comprised of persistence entries.

7. The method of claim 1, wherein at least two DNS servers are authoritative for a particular DNS group.

8. An apparatus, comprising:
    a module for receiving a client's Internet Protocol (IP) address request at a Domain Name Server (DNS) server among a plurality of DNS Servers;
    a module for checking if the receiving DNS server is authoritative for the request;
    a module for forwarding the request to a proper DNS server if the receiving DNS server is not authoritative for the request;
    wherein each DNS server is associated with a subset of DNS groups in a network;
    a module for checking if a persistent response to the request is required;
    a module for sending an appropriate IP address of a content server as a response to the sender of the request if a persistent response is required; and
    wherein the DNS server performs load balancing of the request among a plurality of content servers if no persistent response is required.

9. The apparatus of claim 8, wherein the proper DNS server that the request is forwarded to responds directly to the client.

10. The apparatus of claim 8, wherein the DNS server periodically checks a content server's status for load balancing purposes.

11. The apparatus of claim 8, wherein the DNS server refers to a latency table for load balancing that contains any combination of: content server load, content server latency, and content server availability.

12. The apparatus of claim 11, wherein latency probes periodically measure latency of content servers.

13. The apparatus of claim 8, wherein the DNS server refers to a persistence table that is comprised of persistence entries.

14. The apparatus of claim 8, wherein at least two DNS servers are authoritative for a particular DNS group.

15. A computer-readable medium carrying one or more sequences of instructions, which instructions, when executed by one or more processors, cause the one or more processors to carry out the steps of:
    receiving a client's Internet Protocol (IP) address request at a Domain Name Server (DNS) server among a plurality of DNS Servers;
    checking if the receiving DNS server is authoritative for the request;
    forwarding the request to a proper DNS server if the receiving DNS server is not authoritative for the request;
    wherein each DNS server is associated with a subset of DNS groups in a network;
    checking if a persistent response to the request is required;

sending an appropriate IP address of a content server as a response to the sender of the request if a persistent response is required; and wherein the DNS server performs load balancing of the request among a plurality of content servers if no persistent response is required.

16. A computer-readable medium as recited in claim 15, wherein the proper DNS server that the request is forwarded to responds directly to the client.

17. A computer-readable medium as recited in claim 15, wherein the DNS server periodically checks a content server's status for load balancing purposes.

18. A computer-readable medium as recited in claim 15, wherein the DNS server refers to a latency table for load balancing that contains any combination of: content server load, content server latency, and content server availability.

19. A computer-readable medium as recited in claim 18, wherein latency probes periodically measure latency of content servers.

20. A computer-readable medium as recited in claim 15, wherein the DNS server refers to a persistence table that is comprised of persistence entries.

21. A computer-readable medium as recited in claim 15, wherein at least two DNS servers are authoritative for a particular DNS group.

* * * * *